(12) United States Patent
Stoeppelmann et al.

(10) Patent No.: US 9,631,070 B2
(45) Date of Patent: Apr. 25, 2017

(54) FILLER MATERIALS HAVING SURFACE COATING MADE FROM WATER SOLUBLE POLYAMIDES

(71) Applicant: EMS-PATENT AG, Domat/Ems (CH)

(72) Inventors: Georg Stoeppelmann, Bonaduz (CH); Botho Hoffmann, Domat/Ems (CH); Nikolai Lamberts, Bonaduz (CH)

(73) Assignee: EMS-PATENT AG, Domat/EMS (CH)

( * ) Notice: Subject to any disclaimer, the term of this patent is extended or adjusted under 35 U.S.C. 154(b) by 0 days.

(21) Appl. No.: 14/787,701

(22) PCT Filed: May 5, 2014

(86) PCT No.: PCT/EP2014/059096
§ 371 (c)(1),
(2) Date: Oct. 28, 2015

(87) PCT Pub. No.: WO2014/180779
PCT Pub. Date: Nov. 13, 2014

(65) Prior Publication Data
US 2016/0060436 A1 Mar. 3, 2016

(30) Foreign Application Priority Data
May 8, 2013 (EP) .................................... 13167015

(51) Int. Cl.
| | |
|---|---|
| C08K 9/08 | (2006.01) |
| C09C 3/10 | (2006.01) |
| C09C 1/40 | (2006.01) |
| C09C 1/46 | (2006.01) |
| C09C 1/62 | (2006.01) |
| C09C 1/02 | (2006.01) |
| C09C 1/04 | (2006.01) |
| C09C 1/28 | (2006.01) |
| C09C 1/30 | (2006.01) |
| C08K 7/14 | (2006.01) |
| C08L 77/02 | (2006.01) |
| C08L 77/06 | (2006.01) |

(52) U.S. Cl.
CPC ............... *C08K 9/08* (2013.01); *C08K 7/14* (2013.01); *C08L 77/02* (2013.01); *C08L 77/06* (2013.01); *C09C 1/02* (2013.01); *C09C 1/028* (2013.01); *C09C 1/04* (2013.01); *C09C 1/28* (2013.01); *C09C 1/3072* (2013.01); *C09C 1/40* (2013.01); *C09C 1/407* (2013.01); *C09C 1/46* (2013.01); *C09C 1/62* (2013.01); *C09C 3/10* (2013.01); *C01P 2004/61* (2013.01)

(58) Field of Classification Search
None
See application file for complete search history.

(56) References Cited

U.S. PATENT DOCUMENTS

| | | | |
|---|---|---|---|
| 4,420,512 A | 12/1983 | Ogawa et al. | |
| 4,818,619 A | 4/1989 | Strepparola et al. | |
| 5,804,313 A | 9/1998 | Schell | |
| 5,955,518 A | 9/1999 | Flautt | |
| 6,146,762 A | 11/2000 | D'Herbecourt et al. | |
| 6,592,666 B1 | 7/2003 | Peng et al. | |
| 7,135,516 B2 * | 11/2006 | Sugiura | D06M 7/00 428/364 |
| 9,290,635 B2 * | 3/2016 | Stoeppelmann | C08K 3/346 |
| 2004/0197555 A1 | 10/2004 | Sugiura et al. | |
| 2006/0226404 A1 | 10/2006 | Bauer et al. | |
| 2007/0072970 A1 | 3/2007 | Schneider | |
| 2008/0070154 A1 | 3/2008 | Taguchi | |
| 2010/0159175 A1 | 6/2010 | Stoeppelmann et al. | |
| 2012/0178860 A1 | 7/2012 | Nakamoto et al. | |
| 2013/0164477 A1 | 6/2013 | Stoeppelmann et al. | |

FOREIGN PATENT DOCUMENTS

| | | |
|---|---|---|
| DE | 103 46 326 A1 | 5/2005 |
| EP | 0 875 538 A1 | 11/1998 |
| EP | 1 445 370 A1 | 8/2004 |
| EP | 1 710 275 A1 | 10/2006 |
| EP | 1 894 953 A2 | 3/2008 |
| EP | 2 196 494 A1 | 6/2010 |
| JP | 9-3777 A | 1/1997 |
| WO | 99/26872 A1 | 6/1999 |
| WO | 01/49626 A1 | 7/2001 |

OTHER PUBLICATIONS

International Search Report ISR, mailed Jul. 24, 2014 with respect to Patent Application No. PCT/EP2014/059096.
International Preliminary Report on Patentability, mailed Nov. 19, 2015 with respect to Patent Application No. PCT/EP2014/059096, along with an English translation thereof.
Chinese Office Action dated Sep. 19, 2016 and issued in Chinese Application No. 2014 8002 5808.3.

* cited by examiner

*Primary Examiner* — Vickey Nerangis
(74) *Attorney, Agent, or Firm* — Greenblum & Bernstein, P.L.C.

(57) ABSTRACT

Fillers are proposed, with the exception of layered silicates, which have a surface coating, which comprises a water-soluble polyamide or multiple water-soluble polyamides, wherein at least one of these water-soluble polyamides is produced by polycondensation from monomer components, which comprise at least one dicarboxylic acid and at least one selected ether diamine, preferably having linear oxy-propyl amino end groups. Fillers coated in this manner are suitable for use in the production of filled and/or reinforced thermoplastic plastics molding materials. Thermoplastic plastics molding materials which contain fillers having such a surface coating have good mechanical properties and few emissions (low outgassing).

17 Claims, No Drawings

FILLER MATERIALS HAVING SURFACE COATING MADE FROM WATER SOLUBLE POLYAMIDES

The present invention relates to fillers which have a surface coating, which comprises at least one water-soluble polyamide, the use of such fillers for producing filled and/or reinforced thermoplastic plastics molding materials, and thermoplastic plastics molding materials which contain such coated fillers.

Fillers can be organic (natural or synthetic) or inorganic (natural or synthetic) and can have various geometric shapes and sizes. Particle size, particle shape, and particle structure, but also the physical and chemical properties of the filler material, have an influence as an additive on the properties of the final material, i.e., the molding material filled by mixing or compounding. Fillers can be powdery, grainy (these two forms can be referred to as particulate), or also fibrous. Fibrous fillers are often used for reinforcement, because of which reference is also made to reinforced molding materials in this case. For the optimization of the mechanical properties, the fillers must be well compatible with the matrix of the molding material, i.e., have a good affinity, so that they may be dispersed well and the bond between filler and matrix is loadable. To achieve optimum results, the surfaces of fillers are often pretreated.

A so-called size is applied to fibrous fillers, specifically to natural fibers and also to industrial fibers (carbon fibers, plastic fibers, glass fibers) before the further processing, to make the fibers or threads more supple and resistant to mechanical load. Without this surface coating using a suitable impregnating liquid (size), the fibers can be damaged or even break due to mutual friction. Depending on the intended application, this impregnating liquid (size) can contain greatly differing formulas. The composition must also take into account in particular the aspect of good adhesion to the molding material or to a polymer matrix, so that the strength of the composite material is actually improved.

The sizes for glass fibers predominantly consist of one or more polymeric film formers, a lubricant, a surfactant, and at least one adhesion promoter.

U.S. Pat. No. 5,804,313 describes a coated glass fiber, wherein a mixture made of a water-soluble polyamide (containing oligo-ethylene glycol-diamine), acrylic polymer, adhesion promoter, and fiber lubricant is used. The aqueous size does not contain urethane polymers and consists in a majority of neutralized polyacrylic acid with respect to the solid content. The glass fibers thus coated are cost-effectively producible, but result in worse mechanical properties in the reinforced polymer compositions in comparison to polyurethane sizes, as shown by Table 2 of U.S. Pat. No. 5,804,313.

US 2012/0178860 A1 relates to reinforced polycarbonate compositions containing fibers or inorganic fillers, which are coated using a water-soluble polyamide. Two types of water-soluble polyamides are mentioned: polyamides containing tertiary amino groups and polyamides containing polyalkylene glycol units. Only water-soluble polyamides (commercial products) based on PA6- or PA66- and polyethylene oxide units are specifically disclosed. The content of fillers which were treated using water-soluble polyamides is relatively low at 6 to 22 parts by weight in relation to 100 parts by weight polymer matrix.

EP 1 445 370 B1 claims a carbon fiber size, which contains, inter alia, water-soluble thermoplastic resins, in particular water-soluble polyamides, and also necessarily contains a tenside. Water-soluble polyamides based on PA6- or PA66- and polyethylene oxide units are processed in the examples, wherein the concentration of the polyethylene oxide units is low.

JP 09-003777 A also describes an aqueous size for carbon fibers, which also necessarily contains a surfactant in addition to water-soluble polyamides. The water-soluble polyamide is based in this case on a copolymer made of PA6- or PA66-units and polyethylene oxide units, wherein the polyoxyethylene concentration of these polyamides is even lower than that in the above-mentioned document EP 1 445 370 B1.

EP 2 196 494 A1 describes a polyamide layered silicate composition, in which an untreated clay mineral is dispersed in water and a water-soluble polyamide is dissolved in water and the two solutions are mixed. The resulting and dried product is a layered silicate intercalated with the water-soluble polyamide, in which it is to be expected that during this procedure the surface of the layered silicate particles are also coated with the water-soluble polyamide.

The object of the present invention is to provide fillers, with the exception of layered silicates, with a surface coating, which comprises an alternative water-soluble polyamide, and the use thereof in the production of filled and/or reinforced molding materials results in thermoplastic plastics molding materials having good mechanical properties and low outgassing (low emissions). The surface coating is to have a high thermal resistance and is to offer an improvement in this regard in relation to known coatings based on polyurethane.

This object is achieved according to the present invention by the surface-coated fillers having the features of Claim 1. Preferred embodiments of these fillers result from the dependent claims. In addition, uses (i.e., methods) relating to the production of the surface coating and the production of filled and/or reinforced thermoplastic plastics molding materials are claimed, as well as thermoplastic plastics molding materials which contain fillers having such a surface coating.

Fillers according to the invention, with the exception of layered silicates, have a surface coating, which comprises a water-soluble polyamide or multiple water-soluble polyamides, wherein at least one of these water-soluble polyamides is produced by polycondensation from the following monomer components:

(a) at least one linear-aliphatic, branched-aliphatic, cycloaliphatic, and/or aromatic dicarboxylic acid having 6 to 36 C atoms, preferably having 6 to 18 C atoms, particularly preferably having 6 to 12 C atoms; and (b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5-methyl-decane-1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-1,13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine, 4,7,10,13,16-pentaoxa-nonadecane-1,19-diamine, and 4,17-dioxa-eicosane-1,20-diamine; and (b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36, preferably 4 to 18, particularly preferably 6 to 15 C atoms; and (b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycoles; and (c) 0-45 mol-% of at least one lactam and/or at least one amino carboxylic acid;

wherein the molar quantity of the monomer component (a) in relation to the total of the molar quantities of the monomer components (b1)+(b2)+(b3) has a molar ratio in the range of 0.8 to 1.2, and wherein the fraction of the monomer component (c) relates to the molar total of all monomer components (a)+(b1)+(b2)+(b3)+(c) forming the at least one water-soluble polyamide.

The diamines of group (b1) are selected from ether diamines, which do not comprise oxyethyl amino end groups, but rather preferably linear oxypropyl amino end groups. Preferably, these ether diamines (b1) make up at least 50 mol-%, particularly preferably at least 70 mol-%, and very particularly preferably at least 90 mol-% in relation to the total of the molar quantities of the monomer components (b1)+(b2)+(b3). In particular, it is preferable if the diamine component is exclusively formed from component (b1) i.e., when (b1)=100 mol-% and both (b2) and also (b3)=are zero.

In preferred fillers, for at least one of the water-soluble polyamides of the surface coating, adipic acid and/or sebacic acid are selected as monomer component (a), 4,7,10-trioxa-tridecane-1,13-diamine and/or 4,7,10,13-tetraoxa-hexadecane-1,16-diamine are selected as monomer component (b1), and optionally hexane diamine is selected as monomer component (b2). Water-soluble polyamides containing adipic acid and 4,7,10-trioxa-tridecane-1,13-diamine are particularly preferred. A preferred water-soluble polyamide consists, for example, of (a) 60-100 mol-% adipic acid and 0-40 mole-% sebacic acid (in relation to a total of 100 mol-% dicarboxylic acids), and of (b1) 60-100 mol-% trioxatridecane diamine and/or tetraoxahexadecane diamine and (b2) 0-40 mol-% hexane diamine (in relation to a total of 100 mol-% (b1)+(b2)+(b3), with (b3)=0).

The molar ratio of the molar quantity of the monomer component (a) in relation to the total of the molar quantities of the monomer components (b1)+(b2)+(b3) is preferably in the range of 0.85 to 1.15, particularly preferably in the range of 0.9 to 1.1.

The surface coating of fillers according to the invention preferably consists at least 50 wt.-%, preferably at least 70 wt.-%, particularly preferably at least 90 wt.-%, and very particularly preferably exclusively of at least one water-soluble polyamide according to the claims. Furthermore, in a preferred embodiment, the surface coating comprises, in addition to the at least one water-soluble polyamide, at least one adhesion promoter, in particular based on silanes, siloxanes, or aminosilanes. The concentration of the at least one adhesion promoter (i.e., the total of all provided, one or more adhesion promoters) is preferably 10 to 50 wt.-% and particularly preferably 15 to 40 wt.-%, in relation to the total mass of the surface coating calculated as the dry mass (total of all components of the coating solution except for water and low-boiling-point solvents, wherein the latter are understood here as those having a lower boiling point than that of water).

Preferred adhesion promoters are silanes and siloxanes, which can be provided in low-molecular-weight or oligomer form, and preferably contain alkyl, alkoxy, phenyl, vinyl, fluoroalkyl, epoxy, glycidyl, primary, secondary, tertiary, and quaternary amine groups. Adhesion promoters are particularly preferred which contain hydrolyzable alkoxysilyl groups and/or reactive amino groups, wherein primary and secondary amino groups are preferred with respect to the amino groups. Preferred adhesion promoters are alkylalkoxysilane compounds, aminoalkoxysilane compounds, and bisaminoalkoxysilane compounds. In this case, the preferred alkyl groups of these compounds have 1 to 24 carbon atoms, wherein methyl, ethyl, propyl, butyl, isobutyl, pentyl, hexyl, heptyl, or octyl groups are particularly preferred. Preferred alkoxy groups have 1 to 8 carbon atoms, wherein methoxy, ethoxy, and propoxy groups are particularly preferred.

Preferably usable adhesion promoters are: aminopropyltrimethoxy silane, 3-aminopropyltriethoxy silane (AMEO), diaminoethylene-3-propyltrimethoxy silane (DAMO), triaminodiethylene-3-propyltrimethoxy silane (TRIAMO), aminopropylmethyldiethoxy silane, aminopropylmethyldimethoxy silane, 2-aminoethyl-trimethoxy silane, 2-aminoethyl-methyl-dimethoxy silane, 2-aminoethyl-phenyl-dimethoxy silane, 2-aminoethyl-triethoxy silane, 2-aminoethyl-methyl-diethoxy silane, 2-aminoethyl-triethoxy silane, 2-(2-aminoethylamino)-ethyl-triethoxy silane, 6-amino-n-hexyl-triethoxy silane, 6-amino-n-hexyl-trimethoxy silane, 6-amino-n-hexyl-methyl-dimethoxy silane and in particular 3-amino-n-propyl-trimethoxy silane, 3-amino-n-propyl-methyl-dimethoxy silane, 3-amino-n-propyl-triethoxy silane, 3-amino-n-propyl-methyl-diethoxy silane, 1-aminomethyltriethoxy silane, 1-aminomethylmethyldiethoxy silane, 1-aminomethyltrimethoxy silane, 1-aminomethylmethyldiethoxy silane, N-butyl-3-aminopropyltriethoxy silane, N-butyl-3-aminopropylmethyldiethoxy silane, N-butyl-3-aminopropyltrimethoxy silane, N-butyl-3-aminopropylmethyldimethoxy silane, N-butyl-1-amino-methyltriethoxy silane, N-butyl-1-aminomethylmethyldimethoxy silane, N-butyl-1-aminomethyltrimethoxy silane, N-butyl-1-aminomethylmethyltriethoxy silane, N-cyclohexyl-1-aminomethylmethyltriethoxy silane, N-cyclohexyl-1-aminomethylmethyltrimethoxy silane, N-phenyl-1-aminomethylmethyltriethoxy silane, N-phenyl-1-aminomethylmethyltrimethoxy silane, N-formyl-3-aminopropyltriethoxy silane, N-formyl-3-aminopropyltrimethoxy silane, N-formyl-1-aminomethylmethyldimethoxy silane, bis(triethoxysilylpropyl)amin, tris(triethoxysilylpropyl)amine, tris(trimethoxy-silylpropyl)amine, 3-glycidoxypropyltrialkoxy silane, as triethoxy- or trimethoxy silane; epoxycyclohexyltrialkoxy silane, as triethoxy- or trimethoxy silane, propyltrimethoxy silane (PTMO), dimethyldimethoxy silane (DMDMO), dimethyldiethoxy silane, methyltriethoxy silane (MIES), propylmethyldimethoxy silane, propyl-methyldiethoxy silane, n-octyl-methyl-dimethoxy silane, n-hexyl-methyldimethoxy silane, n-hexyl-methyl-diethoxy silane, propyltriethoxy silane, isobutyltrimethoxy silane, isobutyltriethoxy silane, octyltrimethoxy silane, octyltriethoxy silane, n-hexyl-triethoxy silane, cyclohexyl-triethoxy silane, n-propyl-tri-n-butoxy silane, n-propyl-trimethoxy silane, n-propyl-triethoxy silane, isobutyl-triethoxy silane, hexadecyltriethoxy silane, hexadecyltrimethoxy silane, octadecyltriethoxy silane, octadecyltrimethoxy silane, octadecylmethyl-diethoxy silane, octadecylmethyldimethoxy silane, hexadecylmethyldimethoxy silane, hexadecylmethyldiethoxy silane, and/or N-formyl-1-aminomethylmethyldiethoxy-silane, tetraethyl orthosilicate, vinyl-tris(2-methoxy-ethoxy)silane, 3-aminopropyl-triethoxy silane, tetramethoxy silane, γ-methacryloxytrimethoxy silane, γ-aminopropyl-triethoxy silane, N-β-(aminoethyl)-γ-(aminopropyl)-triethoxy silane, N-vinylbenzyl-N'-aminoethyl-3-aminopropylpolysiloxane hydrochloride or N-β-(aminoethyl)-γ-(aminopropyl) trimethoxy silane or the mixtures thereof. Particularly preferred adhesion promoters are methoxy, ethoxy, or propoxy silanes having primary and/or secondary amino groups.

The surface coating of the fillers or the preferably aqueous coating solution used for the surface coating (for example, an immersion bath) can optionally contain further components (materials), for example, further film formers different from the water-soluble polyamide, antistatic agents, lubricants, solvents, surfactants, adhesion promoters, and auxiliary materials. These components can make up to 50 wt.-%, preferably up to 40 wt.-%, in particular 10-40 wt.-%, in relation to the total mass of the surface coating calculated as the dry mass (total of all components of the coating solution except for water and low-boiling-point solvents).

However, the surface coating preferably does not contain a surfactant, an antistatic agent, an emulsifier, or a stabilizer. The surface coating particularly preferably does not contain a surfactant. Furthermore, the surface coating preferably does not contain any further polymeric film formers in addition to the water-soluble polyamides according to the invention, in particular no further water-soluble polymeric film formers or film formers based on polyurethane.

"Water-soluble" refers according to the invention to a polyamide, which is soluble in pure water, and is solvated in water at the molecular level in the dissolved state. In particular, water solubility exists if at least 10 g, preferably at least 50 g, and particularly preferably at least 100 g polyamide are completely soluble, i.e., without sediment, in 1000 g water at 23° C. Since the water-soluble polyamide film former is provided molecularly dissolved in water or a medium containing water during the application to the fillers, no stabilizing additives are required, as are necessary, for example, for polyurethane dispersions. In addition, the coating baths according to the invention are stable over significantly longer periods of time in comparison to baths which contain polymer dispersions.

The water-soluble polyamide according to the claims is in particular a cold-water-soluble polyamide having a relatively low solution viscosity (RV or $\eta_{rel}$) in the range of 1.3 to 3.0, preferably in the range of 1.4 to 2.0, in particular in the range of 1.5 to 1.9 (measurement method cf. below). Polyether amides, in particular having random structure, are preferably used as the water-soluble polyamide. The ether groups located between the amide bonds are preferably oxyethylene and oxypropylene units.

It is to be noted here on the term "polyamide" that "polyamide" is a generic term, under which homopolyamides, copolyamides, polyether amides, polyetherester amides, and mixtures (blends) of various polyamides fall. The water-soluble polyamide according to the claims is more precisely a water-soluble polyether amide (which is preferred), or a polyetherester amide in the case that a polyalkylene glycol is provided as the monomer component (b3).

With respect to the optional monomer component (b3), oligooxyethylene diamines refers to short-chain ethylene glycol diamines, in particular diethylene glycol diamine, triethylene glycol diamine, and tetraethylene glycol diamine. Polyoxyalkylene diamines are polyalkylene glycol diamines having a number average molar mass in the range of 400 to 2000 g/mol, preferably in the range of 500 to 1500 g/mol, and particularly preferably in the range of 500 to 1200 g/mol, in particular polyethylenglycol diamines, polypropylenglycol diamines, polytetramethylene diamines, and polyether diamines based on at least two monomers selected from the group consisting of ethylene oxide, propylene oxide, and tetrahydrofuran, for example, copolymers with polyoxyethylene and polyoxypropylene units, wherein the polyoxyethylene units predominate. Polyalkylene glycols having a number average molar mass in the range of 200 to 2000 g/mol, preferably in the range of 400 to 1600 g/mol, and particularly preferably in the range of 400 to 1000 g/mol come into consideration as the polyalkylene glycol, in particular polyethylene glycol, polypropylene glycol, polytetrahydrofuran, and copolymers with polyoxyethylene, polyoxypropylene, and/or polyoxytetramethylene units, wherein the polyoxyethylene units predominate.

Linear-aliphatic, branched-aliphatic, cycloaliphatic, and/or aromatic diamines of the optional monomer component (b2) which are suitable for the synthesis of the water-soluble polyamides according to the claims are, for example, 1,4-butane diamine, 1,5-pentane diamine, 2-methyl-1,5-pentane diamine, 2-butyl-2-ethyl-1,5-pentane diamine, 1,6-hexane diamine, 2,2,4-trimethylhexamethylene diamine, 2,4,4-trimethylhexamethylene diamine, 1,8-octane diamine, 2-methyl-1,8-octane diamine, 1,9-nonane diamine, 1,10-decane diamine, 1,11-undecane diamine, 1,12-dodecane diamine, 1,13-tridecane diamine, 1,14-tetradecane diamine, m-xylylene diamine, p-xylylene diamine, bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclo-hexyl)-methane (TMDC), 2,6-norbornane diamine or 2,6-bis-(aminomethyl)-norbornane or 1,3-diaminocyclohexane, 1,4-diaminocyclohexane diamine, isophorone diamine, 1,3-bis-(aminomethyl)cyclohexane, and 1,4-bis-(aminomethyl)cyclohexane. Linear-aliphatic diamines having 6 to 12 carbon atoms are preferred, in particular 1,6-hexane diamine. These diamines preferably do not make up more than 40 mol-% in relation to the total of the molar quantities of the monomer components (b1)+(b2)+(b3).

Dicarboxylic acids (a) suitable for the water-soluble polyamide according to the claims are: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36 dimeric fatty acid, isophthalic acid, terephthalic acid, naphthalene dicarboxylic acid, cis and/or trans cyclohexane-1,4-dicarboxylic acid and/or cis and/or trans cyclohexane-1,3-dicarboxylic acid (CHDA) and mixtures thereof. Aromatic dicarboxylic acids and linear-aliphatic dicarboxylic acids are preferred. The dicarboxylic acids adipic acid, azelaic acid, sebacic acid, dodecane diacid, and terephthalic acid and isophthalic acid are particularly preferred. A water-soluble polyamide is particularly preferred, the fraction of which of adipic and/or sebacic acid is at least 50 mol-%, in relation to the total of all dicarboxylic acids of monomer component (a). In particular, it is preferable if the fraction of the terephthalic acid in monomer component (a) is less than 45 mol-% or no terephthalic acid is contained in monomer component (a).

The water-soluble polyamides according to the claims can optionally also contain as the further monomer component (c) lactams and/or amino carboxylic acids, in particular α,ω-amino acids or lactams having 5 to 12 carbon atoms, wherein the following selection is mentioned as an example: m-amino benzoic acid, p-amino benzoic acid, caprolactam (CL), ω-amino caproic acid, co-amino heptanoic acid, ω-amino octanoic acid, co-amino nonanoic acid, ω-amino decanoic acid, ω-amino undecanoic acid (AUA), laurin lactam (LL), and co-amino dodecanoic acid (ADA). Caprolactam, amino caproic acid, laurin lactam, amino undecanoic acid, and amino dodecanoic acid are particularly preferred. The fraction of lactams and/or amino acids is preferably 2 to 40 mol-% and particularly preferably 3 to 35 mol-%, in relation to the molar total of all monomer components (a)+(b1)+(b2)+(b3)+(c) forming the at least one water-soluble polyamide.

The fillers are selected from inorganic and/or organic materials. The fillers are preferably selected from fibrous and/or particulate materials.

In the surface-coated filler according to the invention, the actual filler fraction is preferably 80-99.8 wt.-%, i.e., the fraction of the surface coating comprising at least one water-soluble polyamide according to the claims is preferably in the range of 0.2-20 wt.-%. In particular, it is preferable if the fraction of the surface coating is in the range of 0.3 to 10 wt.-%.

Fillers in the meaning of the present invention are, as mentioned, both particulate fillers and also fibrous fillers. Functional additives for the plastic production also fall under fillers, for example, organic and inorganic flame retardants, conductivity additives (for increasing the thermal and/or electrical conductivity) or pigments, which can also be pretreated or surface coated according to the invention.

The fillers are preferably selected from the group consisting of glass fibers, carbon fibers, metal fibers, boron fibers, aramid fibers, organic flame retardants, inorganic flame retardants and synergists, thermally and/or electrically conductive additives, and mineral fillers, wherein layered silicates are excluded.

According to one preferred embodiment of the proposed surface-coated fillers, the fillers and reinforcing agents are fibers, in particular glass or carbon fibers (carbon fibers, graphite fibers), metal fibers, potassium titanate whiskers, boron fibers, aramid (p or m aramid fibers (for example, Kevlar® or Nomex®, DuPont)) and basalt fibers, wherein preferably short fibers, preferably having a length in the range of 2 to 50 mm and a diameter of 5 to 40 μm or endless fibers (rovings) are used, and wherein in particular fibers having circular or noncircular cross-sectional area are used, wherein in the latter case the dimension ratio of the main cross-sectional axis to the secondary cross-sectional axis is >2 in particular, preferably in the range of 2 to 8 and particularly preferably in the range of 3 to 5. These so-called flat glass fibers have a cross-sectional area which is oval, elliptical, elliptical provided with constriction(s) (so-called "cocoon" fiber), rectangular, or nearly rectangular. A further preferred feature of the flat glass fibers used is that the length of the main cross-sectional axis is preferably in the range of 6 to 40 μm, in particular in the range of 15 to 30 μm, and the length of the secondary cross-sectional axis is in the range of 3 to 20 μm, in particular in the range of 4 to 10 μm.

The above-mentioned round cut glass fibers (short glass fibers), i.e., cut glass fibers having round cross section, preferably have a diameter in the range of 5 to 17 μm, in particular in the range of 6 to 10 μm.

The glass fibers used as rovings according to the invention typically have a diameter of 5 to 20 μm, preferably 8 to 20 μm, particularly preferably 9 to 18 μm, and very particularly preferably 10 to 17 μm, wherein the cross section of the glass fibers can be round, oval, elliptical, nearly rectangular, or rectangular. So-called flat endless glass fibers having a ratio of the cross sectional axes of 2 to 5 are particularly preferred.

In particular, E glass fibers are used according to the invention. The glass fibers themselves, independently of the shape of the cross-sectional area and length of the fibers, can be selected from the group of E glass fibers, A glass fibers, C glass fibers, D glass fibers, M glass fibers, S glass fibers, and/or R glass fibers, wherein E glass fibers are preferred.

The endless carbon fibers (carbon fibers) used preferably have a diameter of 5 to 10 μm, particularly preferably 5 to 8 μm, and very particularly preferably 6 to 7 μm.

The fillers and reinforcing agents can also be particulate fillers. In this case, preferably mineral fillers (except for layered silicates) can be used as particulate fillers according to the invention, such as non-layered silicates, quartz, titanium dioxide, wollastonite, amorphous silicic acids, magnesium carbonate, magnesium hydroxide, chalk, limestone, feldspar, barium sulfate, solid or hollow glass beads or ground glass, or also metals or metal compounds or alloys.

Layered silicates can also be surface-coated but because of the disclaimer they do not fall under the scope of protection of this patent application.

Fillers in the meaning of the invention are in particular also conductivity additives (thermal, electrical) and flame retardants.

Flame retardants comprise both halogenated and halogen-free flame retardants, wherein halogen-free flame retardants are preferred. Particularly preferred flame retardants are phosphonates, alkyl phosphonates, cyclic phosphonates and phosphinates, in particular straight-chain or cyclic phosphonates and phosphinic acid salts and/or diphosphinic acid salts, melamine polyphosphate, melem, melam, or melon, melamine cyanurate, or reaction products of melamine with pyrophosphoric acid or reaction products of condensation products of melamine with pyrophosphoric acid. Preferably aluminum, calcium, and zinc ions are used as metal ions of the phosphinic acid salts or diphosphinic acid salts. Such flame retardants, which can be included among the organic fillers, are known from the prior art. Reference is made in this regard to DE 103 46 326 A1. The flame retardants also include synergists, for example, barium carboxylate, metal compounds containing oxygen, nitrogen, or sulfur, in particular of the metals aluminum, calcium, magnesium, barium, sodium, potassium, and zinc. Suitable compounds are selected from the group of oxides, hydroxides, carbonates, silicates, borates, phosphates, stannates, and combinations or mixtures of these compounds, for example, oxide-hydroxides or oxide-hydroxide-carbonates. Examples are magnesium oxide, calcium oxide, aluminum oxide, zinc oxide, barium carbonate, magnesium hydroxide, aluminum hydroxide, boehmite, dihydrotalcite, hydrocalumite, calcium hydroxide, tin oxide hydrate, zinc hydroxide, zinc borate, zinc sulfide, zinc phosphate, sodium carbonate, calcium carbonate, calcium phosphate, magnesium carbonate, basic zinc silicates, zinc stannate. Systems such as calcium stearate, zinc stearate, magnesium stearate, potassium palmitate, magnesium behenate are also possible. The following are mentioned as specific examples of such flame retardants: Exolit® OP 1230 (Clariant), Exolit® OP 1312 (Clariant), Melapur® 200/70, Melapur® MC50 and MC25, Melapur® MP (BASF). Phosphinic acid salts, diphosphinic acid salts, and melamine polyphosphate are particularly preferred as flame retardants.

Fillers according to the invention, which increase the thermal conductivity of molding materials, are, for example: quartz, aluminum oxide, magnesium oxide, calcium fluoride, aluminum nitride, silicon carbide, silicon nitride, boron nitride, boron carbide, zinc sulfide, powdered metals, for example, aluminum, copper, or silver.

Preferably, oxidic filler particles based on the following metals are used as thermal conductivity additives: silicon, tin, titanium, zirconium, calcium, strontium, barium, aluminum, yttrium, zinc, tantalum, cerium, gadolinium, holmium, erbium, ytterbium, and glass, glass ceramic, and ceramic-forming materials and/or the combinations thereof. The material can be crystalline, partially crystalline, and also amorphous.

Preferred heat-conducting fillers are quartz, aluminum oxide, and boron nitride. Fundamentally, splintered, spherical, fibrous, and also plate-shaped particles can be used.

The particle size is oriented to the respective intended purpose. If filled molding materials according to the invention are used in thin-walled molded bodies, it is advantageous for the maximum particle size to remain significantly below the wall thickness to be implemented; the maximum particle size is preferably less than half of the wall thickness. The mean particle size is preferably less than 300 µm, preferably less than 100 µm, particularly preferably less than 50 µm.

Boron nitride is preferably used with a particle size of approximately 1 to approximately 50 µm, wherein the boron nitride can be a cubic boron nitride, a hexagonal boron nitride, an amorphous boron nitride, a rhombohedric boron nitride, or a combination thereof. The hexagonal boron nitride is particularly preferred.

Graphite having a particle size of approximately 1 to 200 µm can also be used as a conductive filler (both thermal and also electric). It is preferred in this case if the graphite is a crystalline vein graphite (Crystal Vein Graphite), a flake graphite, an expanded graphite, a microcrystalline or amorphous graphite, a synthetic graphite, or a combination thereof.

Filler mixtures of graphite and boron nitride are advantageously also used. Furthermore, two-dimensional large-area carbon macromolecules such as graphene can be used as a conductive filler.

The invention also relates to the use of at least one filler for producing filled and/or reinforced thermoplastic plastics molding materials, wherein the filler differs from layered silicates and has a surface coating which comprises a water-soluble polyamide or multiple water-soluble polyamides, wherein at least one of these water-soluble polyamides is produced by polycondensation from the following monomer components:
(a) at least one linear-aliphatic, branched-aliphatic, cycloaliphatic, and/or aromatic dicarboxylic acid having 6 to 36 C atoms, preferably having 6 to 18 C atoms, particularly preferably having 6 to 12 C atoms; and
(b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5-methyl-decane-1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-1,13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine, 4,7,10,13,16-pentaoxa-nonadecane-1,19-diamine, and 4,17-dioxa-eicosane-1,20-diamine; and
(b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36, preferably 4 to 18, particularly preferably 6 to 15 C atoms; and
(b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycoles; and
(c) 0-45 mol-% of at least one lactam and/or at least one amino carboxylic acid;
wherein the molar quantity of the monomer component (a) in relation to the total of the molar quantities of the monomer components (b1)+(b2)+(b3) has a molar ratio in the range of 0.8 to 1.2, and
wherein the fraction of the monomer component (c) relates to the molar total of all monomer components (a)+(b1)+(b2)+(b3)+(c) forming the at least one water-soluble polyamide.

During this use or during the production of the surface coating, in a first method step, the surface coating is preferably applied to the fillers from an aqueous solution, which comprises at least one water-soluble polyamide according to the claims. There are various methods for this coating from an aqueous solution. Immersing the fillers in such a solution is preferred, so that the surface thereof is covered with dissolved polyamide, followed by subsequent drying and if necessary reducing the coated bulk material to small pieces into a form which can be metered. Endless fibers may be coated elegantly and continuously in this manner, in that such fiber bundles or rovings are drawn through an immersion bath or a series of immersion baths, which contain the dissolved water-soluble polyamide and if necessary the adhesion promoter and optionally further components (materials). After the drying step, these impregnated rovings can be cut into pieces which can be metered. Both endless fibers and also particulate fillers may also be coated with a corresponding solution by spraying. A preferred method for particulate materials is spraying and coating in a fluid bed or in a fluidized bed apparatus, where the particles are held in a fluidized state. During the spraying of the solution, the moving particles are coated in an isolated state and also dried in the fluidized bed, so that they remain ideally pourable and chopping of agglomerates after the coating is superfluous.

Flame retardants or flame retardant combinations can be coated, for example, in the manner of EP 1 710 275 B1, with the water-soluble polyamides according to the invention and converted into the desired application form (size and size distribution of the particulate fillers).

The method for treating fibers with the size according to the invention (surface coating solution) is performed by the application thereof to the surface, removal of the excess size, and the thermal treatment of the coated fibers. Subsequently, the fibers (strands) can be cut. The application of the size is performed, for example, by a typical spray nozzle or using a godet or applicator, for example, as described in U.S. Pat. No. 6,592,666 B1, WO 1999/026872 A1, WO 2001/049626 A2, or EP 1 894 953 A2 for glass fibers, and in U.S. Pat. No. 4,420,512 B1 and EP 1 445 370 B1 for carbon fibers. The fibers thus coated are dried in the scope of a thermal treatment. The fibers are then rolled up (roving) or cut (staple fibers). The drying is preferably performed in a temperature range between 80 and 200° C.

The at least one surface-coated filler according to the invention is used for producing filled or reinforced thermoplastic plastics molding materials, during the production of which the surface-coated filler is preferably incorporated into at least one polymer, which is selected from the group consisting of polyamides, polycarbonates, polystyrene, polyacrylates, in particular polymethacrylate and polymethyl methacrylate, acrylonitrile-butadiene-styrene copolymer, acrylonitrile-styrene copolymer, functionalized polyolefins, polyoxymethylene, polyesters, in particular polyethylene terephthalate and polybutylene terephthalate, polysulfones, in particular of the type PSU, PESO, and PPSU, polyphenylene ether, polyphenylene sulfide, polyphenylene oxide, liquid crystal polymers, polyether ketone, polyether ether ketone, polyimide, polyamide imide, polyester imide, polyester amide, polyurethanes, in particular of the type TPU, polysiloxanes, and mixtures and copolymers based on these polymers.

In a particularly preferred use, the at least one polymer into which the at least one surface-coated filler is incorporated comprises a polyamide.

It is also to be noted here with reference to the polyamide used as the matrix polymer of the molding material that "polyamide" is a generic term, under which homopolyamides, copolyamides, polyether amides, polyetherester amides, and mixtures (blends) of various polyamides fall.

The invention also comprises a thermoplastic plastics molding material, which contains at least one filler different from layered silicates, which has a surface coating which comprises a water-soluble polyamide or multiple water-soluble polyamides, wherein at least one of these water-soluble polyamides is produced by polycondensation from the following monomer components:

(a) at least one linear-aliphatic, branched-aliphatic, cycloaliphatic, and/or aromatic dicarboxylic acid having 6 to 36 C atoms, preferably having 6 to 18 C atoms, particularly preferably having 6 to 12 C atoms; and (b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5-methyl-decane-1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-1,13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine, 4,7,10,13,16-pentaoxa-nonadecane-1,19-diamine, and 4,17-dioxa-eicosane-1,20-diamine; and (b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36, preferably 4 to 18, particularly preferably 6 to 15 C atoms; and (b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycoles; and (c) 0-45 mol-% of at least one lactam and/or at least one amino carboxylic acid;

wherein the molar quantity of the monomer component (a) in relation to the total of the molar quantities of the monomer components (b1)+(b2)+(b3) has a molar ratio in the range of 0.8 to 1.2, and wherein the fraction of the monomer component (c) relates to the molar total of all monomer components (a)+(b1)+(b2)+(b3)+(c) forming the at least one water-soluble polyamide.

This thermoplastic plastics molding material preferably contains at least one polymer which is selected from the group consisting of polyamides, polycarbonates, polystyrene, polyacrylates, in particular polymethacrylate and polymethyl methacrylate, acrylonitrile-butadiene-styrene copolymer, acrylonitrile-styrene copolymer, functionalized polyolefins, polyoxymethylene, polyesters, in particular polyethylene terephthalate and polybutylene terephthalate, polysulfones, in particular of the type PSU, PESO, and PPSU, polyphenylene ether, polyphenylene sulfide, polyphenylene oxide, liquid crystal polymers, polyether ketone, polyether ether ketone, polyimide, polyamide imide, polyester imide, polyester amide, polyurethanes, in particular of the type TPU, polysiloxanes, and mixtures and copolymers based on these polymers.

The at least one polymer of the plastics molding material particularly preferably comprises a polyamide, so that it is a polyamide molding material.

Preferred embodiments according to the invention of a polyamide molding material contain fibrous fillers having a surface coating according to the invention and/or particulate fillers having a surface coating according to the invention. One preferred embodiment are polyamide molding materials reinforced with fibrous fillers, wherein the coated fillers according to the invention are used. A further embodiment relates to polyamide molding materials, in which both the reinforcement fibers and also simultaneously present particulate fillers are coated according to the invention. Molding materials containing a combination of coated reinforcement fibers according to the invention and coated flame retardants and/or heat-conductive fillers according to the invention are particularly preferred. Molding materials are particularly preferred which contain glass fibers and particulate fillers of a general type and/or flame retardants (as special particulate fillers) and/or heat-conductive additives (as special particulate fillers) adjacent to one another, wherein all of these fillers, i.e., glass fibers, particulate fillers, flame retardants, and heat-conductive additives are surface coated according to the invention.

One preferred polyamide molding material contains, for example, 5-45 wt.-% surface-coated glass fibers and 5-15 wt.-% surface-coated flame retardant. Another preferred polyamide molding material contains, for example, 5-45 wt.-% surface-coated fibrous fillers (glass fibers or carbon fibers) and 5-35 wt.-% surface-coated particulate fillers.

A preferred heat-conductive polyamide molding material contains, for example, 40-85 wt.-% surface-coated conductivity additive.

Preferred thermoplastic molding materials having high thermal conductivity contain 5 to 95 wt.-%, preferably 20 to 80 wt.-% of a thermoplastic polymer, preferably polyamide, and 5 to 95 wt.-%, preferably 20 to 80 wt.-%, particularly preferably 40 to 70 wt.-% of compounds of the elements of the third main group with elements of the fifth or sixth main group of the periodic system or the mixtures thereof, preferably boron compounds or aluminum compounds, particularly preferably aluminum oxide or boron nitride, which are superficially coated using at least one water-soluble polyamide according to the invention, and 0 to 30 wt.-%, preferably 5 to 20 wt.-%, particularly preferably 10 to 15 wt.-% of a thermally and electrically conductive filler, preferably manifestations of carbon, particularly preferably graphite, which is optionally coated using the water-soluble polyamide according to the invention, and 0-25 wt.-%, preferably 5-20 wt.-% glass or carbon fibers, which are optionally coated using the water-soluble polyamide according to the invention.

For clarification, it is also to be appended here that the plastics molding materials or polyamide molding materials can certainly also contain layered silicates in uncoated or coated form. However, such plastics molding materials are only according to the invention and in the range of the present scope of protection if they also contain at least one further filler, which differs from the layered silicates and has a surface coating according to the invention.

Moreover, the plastics molding material or the matrix polymer used for the molding material can contain arbitrary further additives, for example, stabilizers, chain regulators, processing aids, etc.

The surface-coated fillers according to the invention are non-sticky, well processable, and may be dispersed very well in polyamide molding materials in particular. Because of the good adhesion and wetting properties, preferred filled polyamide molding materials result, which are distinguished by good processing ability in the injection molding process and by good mechanical properties, in particular the toughness (impact strength and notched impact strength) and the breaking strength. Furthermore, the components manufactured from the molding materials according to the invention display an improvement in the fatigue behavior in the event of alternating mechanical strain, which results in a longer service life of the claimed parts. A further advantage of the molding materials according to the inventions results because the coated fillers according to the invention release fewer volatile components under the influence of heat in comparison to fillers of the prior art (i.e., outgas less), so that blooming during the processing or blistering of the molded part, for example, in the soldering process, are substantially avoided. The water-soluble polyamides are additionally distinguished by good thermal stability. A further advantage which results upon the use of the fillers according to the invention because of the good compatibility with the polyamide matrix are glossy surfaces of such polyamide molding materials, which comes to bear especially in the case of thin coatings, which are applied in the extrusion method.

Therefore, alternative surface-coated fillers can be provided by the present invention, which result in unexpected property advantages in particular in polyamide molding materials.

The production of the water-soluble polyamides used in the examples is described hereafter.

Production of Water-Soluble Polyamide A1

59.82 kg adipic acid, 90.18 kg trioxatridecane diamine, and 10 kg water were poured into a reactor, rendered inert using nitrogen, and heated to 245° C. As soon as this temperature was reached, the depressurization began: after reaching this temperature, the reactor was depressurized to normal pressure within one hour. The polymer melt was then kept at 245° C. for a further hour while stirring, wherein the reaction water was removed at normal pressure by transferring nitrogen. After pressing on 5 bar nitrogen, the reactor contents were discharged through a die plate. After cooling of the polymer strands on a fluidized bed, they were granulated. The polyether amide formed had a relative solution viscosity of 1.93, a COOH end group concentration of 31 mmol/kg, and a $NH_2$ end group concentration of 38 mmol/kg and had good cold water solubility.

Production of Water-Soluble Polyamide A2

30.59 kg adipic acid, 40.45 kg sebacic acid, 90.18 kg trioxatridecane diamine, and 10 kg water were poured into a reactor, rendered inert using nitrogen, and heated to 245° C. As soon as this temperature was reached, the depressurization began: after reaching this temperature, the reactor was depressurized to normal pressure within one hour. The polymer melt was then kept at 245° C. for a further hour while stirring, wherein the reaction water was removed at normal pressure by transferring nitrogen. After pressing on 5 bar nitrogen, the reactor contents were discharged through a die plate. After cooling of the polymer strands on a fluidized bed, they were granulated. The polyether amide formed had a relative solution viscosity of 1.84, a COOH end group concentration of 30 mmol/kg, and a $NH_2$ end group concentration of 48 mmol/kg and had good cold water solubility.

Production of Water-Soluble Polyamide A3

59.82 kg adipic acid, 11.62 kg 1,6-hexane diamine, 72.55 kg 4,7,10-trioxatridecane-1,13-diamine, and 10 kg water were poured into a reactor, rendered inert using nitrogen, and heated to 245° C. As soon as this temperature was reached, the depressurization began: after reaching this temperature, the reactor was depressurized to normal pressure within one hour. The polymer melt was then kept at 245° C. for a further hour while stirring, wherein the reaction water was removed at normal pressure by transferring nitrogen. After pressing on 5 bar nitrogen, the reactor contents were discharged through a die plate. After cooling of the polymer strands on a fluidized bed, they were granulated. The polyether amide formed had a relative solution viscosity of 1.90, a COOH end group concentration of 40 mmol/kg, and a $NH_2$ end group concentration of 45 mmol/kg and had good cold water solubility.

The invention will be described hereafter using specific exemplary embodiments (having coating according to the invention) and compared to the less capable systems according to the prior art (comparative examples). The exemplary embodiments specified hereafter are used to support the invention and for evidence of the differences from the prior art, but they are not to be used to restrict the general subject matter of the invention, as defined in the patent claims.

Surface Coating (Size) According to the Invention Made of Water-Soluble Polyamide A1, and Model Sizes According to the Prior Art PU1 and PU2

The components listed in following Table 1 for the surface coating were dissolved or diluted at 23° C. under stirring with 9 parts distilled water and used for coating glass fiber rovings.

The bare E glass fiber rovings were manufactured using a pilot spinning plant under near-industrial conditions. For this purpose, E glass beads having a diameter of approximately 20 mm were melted in a melting trough and drawn at 1200° C. through a bushing having 204 nozzles to form round endless fibers. The haul-off speed was set so that a mean fiber diameter of 10 µm resulted. The hot fibers were cooled by spraying using water and wetted via an immersion roll using one of the above-described coating solutions. Subsequently, the 204 individual filaments were bundled into a roving strand having total titer 40 tex and dried at 100° C. for three hours in a vacuum furnace. The corresponding dry weight fraction of the surface coating was subsequently ascertained on a 1 m long roving strand via the weight difference before and after 15 minutes of heating under nitrogen at 600° C. The percentage weight reduction due to the pyrolysis of the organic surface coating corresponds to the dry weight fraction. The dry weight fraction of the coating was set uniformly to 0.6 wt.-% for all samples via a settable stripping device on the immersion roll used for the coating.

TABLE 1 composition (wt.-% in relation to dry mass) of the materials used for coating the glass fiber strands, and temperature stability of the film former component

|  | Coating solution (1 part of the specified components was mixed with 9 parts water) | | |
|---|---|---|---|
|  | PA1 | PU1 | PU2 |
| Film former |  |  |  |
| Water-soluble polyamide A1 | 65% |  |  |
| Neoxil ® 5521 [polyurethane emulsion] |  | 82% |  |
| Baybond ® PU 1810 [polyester urethane dispersion] |  |  | 46% |
| Baybond ® XL 825 [cross-linking agent] |  |  | 27% |
| Adhesion promoter |  |  |  |
| Dynasilan ® AMEO | 10% | 5% | 8% |
| Dynasilan ® 1175 | 25% | 13% | 19% |
| Thermal stability of film former | 430° C. | 375° C. | 380° C. |

Captions for above Table 1:
The commercial film formers, cross-linking agents, and adhesion promoters listed in Table 1 for the glass fiber production can contain still further additives, which are not declared by the producers, such as tensides, stabilizers, softeners, or antistatic agents:
Neoxil ® 5521: Milky white non-ionic polyurethane emulsion, 30% nonvolatile fraction; DSM Composite Resins AG, Switzerland.
Baybond ® PU 1810: Non-ionic polyester urethane polymer, milky white dispersion in water, 60% nonvolatile fraction, Bayer MaterialScience AG, Germany.
Baybond ® XL 825: Blocked aliphatic polyisocyanate based on water as a cross-linking agent for polyurethanes, 30% nonvolatile fraction; from Bayer MaterialScience AG, Germany.
Dynasylan ® AMEO: Ethoxy silane with reactive primary amino groups, Evonik Industries AG, Germany.
Dynasilan ® 1175: Cationic polymeric methoxy silane with reactive amino groups, 40% methanolic solution, Evonik Industries AG, Germany.

Thermal Stability of Film Formers

The determination of the decomposition temperature of the film-forming components (film formers) without adhesion promoter was performed as follows: polyamide A1 was dissolved in 9 parts distilled water and the water was evaporated at room temperature in an 80 mm Petri dish overnight. For PU1, the polyurethane emulsion was diluted with 9 parts distilled water and the residue was pre-cured after evaporation for 20 minutes at 135° C. in the furnace. For PU2, the curing agent was added over 5 minutes with stirring to the polyester urethane dispersion, which was diluted 15 fold. The residue after evaporation was subsequently also precured for 20 minutes at 135° C. 10 mg of the respective film former system was heated in the TGA analyzer at a heating rate of 20 K/minute to 800° C. From 600° C., the flushing medium nitrogen was replaced by air. The maximum of the first derivative of the mass difference against the temperature corresponds to the value indicated in Table 1 for the thermal stability.

EXAMPLES B7 TO B9 AND COMPARATIVE EXAMPLES VB7 TO VB9

The production of compounds from the glass fiber rovings coated with PA1, PU1, or PU2 (see Table 1) and the polyamide granulates listed in Table 3 and also additives was performed on a 36D long double-screw extruder ZSE 27 MAXX (Leistritz, Nuremberg) having a screw diameter of 27 mm. In each case 15 coils of the sized (coated) rovings with titer of 40 tex were assembled by doubling folding to form 600 tex roving strands and wound onto 30 cm long paperboard sleeves with three-inch internal diameter. Each 4 such assembled roving strands with 600 tex each were supplied at 18D (i.e., half screw length) through a side feeder to the extruder. By way of a preceding calibration using 2400 tex standard glass fiber rovings, the extruder screw speed correct for a glass fiber content of 40 wt.-% was ascertained (cf. compounding parameters in Table 2).

The polyamide granulates indicated in Table 3 and the additives were all metered together into the intake zone of the double screw extruder. The most important process parameters are summarized in Table 2.

The extruded strand was cooled in the water bath and continuously granulated. The granulate was dried for 24 hours at 110° C. in vacuum of 30 mbar.

Processing:

The molding materials (granulates) produced by compounding of all examples and comparative examples were injection molded using an injection molding machine Arburg Allrounder 320-210-750 into sample specimens at defined cylinder temperatures of zones 1 to 4 and a defined mold temperature (see Table 2).

TABLE 2 compounding and injection molding conditions for the examples and comparative examples

| Compounding and processing parameters | | Conditions for examples and comparative examples | | | | | | |
|---|---|---|---|---|---|---|---|---|
| | | 1 | 2, 6 | 3, 4 | 5 | 7 | 8 | 9 |
| Compounding | Cylinder temperatures [° C.] | 250 | 280 | 330 | 330 | 280 | 330 | 330 |
|  | Screw speed [RPM] | 200 | 200 | 150 | 150 | 300 | 300 | 300 |
|  | Throughput [kg/h] | 15 | 15 | 8 | 8 | 7.5 | 7.5 | 7.5 |
| Injection molding | Cylinder temperatures [° C.] | 240 | 280 | 330 | 330 | 280 | 330 | 330 |
|  | Mold temperature [° C.] | 80 | 80 | 140 | 140 | 100 | 140 | 140 |
|  | Screw circumferential velocity [m/s] | 15 | 15 | 15 | 15 | 15 | 15 | 15 |

Explanation of Table 2:

The mentioned double screw extruder ZSE 27 MAXX (Leistritz, Nuremberg) was used during the compounding of the examples (and comparative examples) 7, 8, and 9. In the examples (and comparative examples) 1 to 6 described subsequently, in contrast, a dual-shaft extruder from Werner and Pfleiderer having screw diameter of 25 mm as mentioned there was used. The throughput was determined in doing so by the feed metering in the intake zone of the respective extruder. The injection molding to form the sample specimens and test specimens was performed as mentioned foregoing, however, in all examples (and comparative examples) on the same injection molding machine.

TABLE 3

Composition and properties of examples B7 to B9 and comparative examples VB7 to VB9

| Composition | Unit | B7 | VB7-1 | VB7-2 | B8 | VB8-1 | VB8-2 | B9 | VB9-1 | VB9-2 |
|---|---|---|---|---|---|---|---|---|---|---|
| PA 66 | wt.-% | 44.68 | 44.68 | 44.68 | | | | | | |
| PA 6T/6I | wt.-% | | | | 59.58 | 59.58 | 59.58 | 53.58 | 53.58 | 53.58 |
| PA 6I/6T | wt.-% | 14.9 | 14.9 | 14.9 | | | | | | |
| SZM | wt.-% | | | | | | | 6 | 6 | 6 |
| Additive 1 | wt.-% | 0.12 | 0.12 | 0.12 | 0.15 | 0.15 | 0.15 | 0.15 | 0.15 | 0.15 |
| Additive 2 | wt.-% | 0.30 | 0.30 | 0.30 | 0.15 | 0.15 | 0.15 | 0.15 | 0.15 | 0.15 |
| Additive 3 | wt.-% | | | | 0.12 | 0.12 | 0.12 | 0.12 | 0.12 | 0.12 |
| Glass fiber + 0.6% PA1 | wt.-% | 40 | | | 40 | | | 40 | | |
| Glass fiber + 0.6% PU1 | wt.-% | | 40 | | | 40 | | | 40 | |
| Glass fiber + 0.6% PU2 | wt.-% | | | 40 | | | 40 | | | 40 |
| Properties of granulate | | | | | | | | | | |
| Glass fiber length | μm | 308 | 308 | 269 | 289 | 298 | 296 | 281 | 276 | 268 |
| Glass fiber length D10 | μm | 88 | 81 | 83 | 76 | 105 | 86 | 77 | 86 | 70 |
| Glass fiber length D50 | μm | 264 | 268 | 241 | 233 | 269 | 262 | 253 | 245 | 236 |
| Glass fiber length D90 | μm | 576 | 581 | 489 | 605 | 524 | 541 | 519 | 500 | 519 |
| Mechanical material properties dry | | | | | | | | | | |
| Tensile modulus of elasticity | MPa | 11400 | 11600 | 11800 | 12500 | 12900 | 12800 | 11600 | 11200 | 11500 |
| Maximum tensile strength | MPa | 205 | 205 | 205 | 235 | 240 | 235 | 225 | 220 | 220 |
| Elongation at break | % | 4.1 | 3.7 | 4.0 | 2.3 | 2.3 | 2.2 | 3.1 | 2.8 | 2.8 |
| Impact strength | kJ/m$^2$ | 96 | 89 | 97 | 63 | 66 | 64 | 92 | 90 | 89 |
| Notched impact strength | kJ/m$^2$ | 94 | 96 | 94 | 5.1 | 6.1 | 6.2 | | | |
| Mechanical material properties conditioned | | | | | | | | | | |
| Tensile modulus of elasticity | MPa | 10.4 | 11.1 | 10.9 | | | | | | |
| Tensile strength | MPa | 165 | 160 | 165 | | | | | | |
| Elongation at yield | % | 3.9 | 3.6 | 3.8 | | | | | | |
| Impact strength | kJ/m$^2$ | 94 | 96 | 94 | | | | | | |
| Notched impact strength | kJ/m$^2$ | 11.0 | 10.9 | 12.1 | | | | | | |
| Emission | | | | | | | | | | |
| Emission 120° C. | μg/g | | | | 1.2 | 4.2 | 2.3 | | | |
| Emission 200° C. | μg/g | | | | 7.2 | 65.0 | 12.9 | | | |

Captions for Table 3
PA 66 Partially crystalline, aliphatic polyamide made of 1,6-hexane diamine and adipic acid, having a melting point of 260° C. and a relative solution viscosity of 1.85.
PA 6T/6I XE 3733 NK natur: partially crystalline, partially aromatic polyamide made of 1,6-hexane diamine, terephthalic acid, and isophthalic acid, having a melting point of 335° C.; from EMS-Chemie AG, Switzerland.
PA 6I/6T Grivory G21 natur: amorphous, partially aromatic polyamide made of 1,6-hexane diamine, isophthalic acid, and terephthalic acid; from EMS-Chemie AG, Switzerland.
SZM Impact toughness modifier Lotader ® AX8840: random copolymer made of ethylene and glycidyl methacrylate; from Arkema, France.
Additive 1: Hostanox ® PAR 24, tris(2,4-di-tert-butylphenyl)phosphite; commercial product of Clariant, Switzerland.
Additive 2: Irganox ® 1098, N,N'-hexamethylene-bis-3,5-di-tert.-butyl-4-hydroxyhydrocinnamide; commercial product of BASF SE, Germany.
Additive 3: Brüggolen ® P22, nucleating agent for polyamides based on condensation products of oxalic acid with ethylene diamine; from Brüggemann Chemical, Heilbronn, Germany.

EXAMPLES B1 TO B6 AND COMPARATIVE EXAMPLES VB1 TO VB6

The components specified in Tables 4 and 5 were compounded in a dual-shaft extruder from Werner and Pfleiderer having a screw diameter of 25 mm with predefined process parameters (see Table 2), wherein the polyamide granulates and the additives were metered in the intake zone, while the glass fibers were metered via a side feeder 3 housing units before the die into the polymer melt. The molding materials according to Table 4 were drawn off as a strand from a die having 3 mm diameter and granulated after water cooling. The granulate was dried for 24 hours at 110° C. in vacuum of 30 mbar. For the molding materials from Table 5, the granulation was performed by means of underwater granulation or hot die-face cutting underwater, in which the polymer melt was pressed through a perforated die and granulated in a water stream by a rotating cutter directly after exiting from the die.

After granulation and drying at 120° C. for 24 hours, the granulate properties were measured and the test specimens were produced for the measurements of the further properties listed in Tables 4 and 5.

TABLE 4

Composition and properties of examples B1 and B2 and comparative examples VB1 and VB2

| Composition | Unit | VB1 | B1-1 | B1-2 | VB2 | B2-1 | B2-2 |
|---|---|---|---|---|---|---|---|
| PA 12 | wt.-% | 50 | 50 | 50 | | | |
| PA 66 | wt.-% | | | | 50 | 50 | 50 |
| Glass fiber A1 | wt.-% | | 50 | | | 50 | |

TABLE 4-continued

Composition and properties of examples B1 and B2 and comparative examples VB1 and VB2

| Composition | Unit | VB1 | B1-1 | B1-2 | VB2 | B2-1 | B2-2 |
|---|---|---|---|---|---|---|---|
| Glass fiber A2 | wt.-% | | | 50 | | | 50 |
| Glass fiber B | wt.-% | 50 | | | 50 | | |
| | | | | Properties | | | |
| Tensile modulus of elasticity | MPa | 11900 | 11600 | 11800 | 16000 | 15500 | 15600 |
| Breaking strength | MPa | 144 | 160 | 162 | 220 | 230 | 230 |
| Elongation at break | % | 3.3 | 4.0 | 3.9 | 3.5 | 4.0 | 4.2 |
| Impact strength | kJ/m² | 62 | 70 | 75 | 84 | 90 | 92 |
| Notched impact strength | kJ/m² | 16 | 18 | 20 | 12 | 14 | 15 |
| HDT A | °C. | 169 | 170 | 170 | 250 | 250 | 255 |
| HDT C | °C. | 133 | 135 | 134 | 220 | 222 | 224 |

TABLE 5

Composition and properties of examples B3 to B6 and comparative examples VB3 to VB6

| Composition | Unit | VB3 | B3 | VB4 | B4 | VB5 | B5 | VB6 | B6 |
|---|---|---|---|---|---|---|---|---|---|
| PA 10T/6T | wt.-% | 35 | 35 | 44 | 44 | 57 | 57 | | |
| PA 12 | wt.-% | | | | | | | 39.4 | 39.4 |
| SZM | wt.-% | 4 | 4 | 5 | 5 | | | | |
| S/V packet | wt.-% | 1 | 1 | 1 | 1 | 1 | 1 | 0.6 | 0.6 |
| Glass fiber A3 | wt.-% | | 10 | | | | | | |
| Glass fiber B | wt.-% | 10 | | | | 30 | | | |
| Exolit ® OP 1230 | wt.-% | | | | | 12 | | | |
| Aluminum diethyl phosphinate coated with water-soluble polyamide A1 (2.5 wt.-% with respect to this filler) | wt.-% | | | | | | 12 | | |
| Boron nitride B | wt.-% | 50 | | 50 | | | | 60 | |
| Boron nitride A3 | wt.-% | | 50 | | 50 | | | | 60 |
| | | | | Properties | | | | | |
| Tensile modulus of elasticity | MPa | 13800 | 13700 | 8600 | 8500 | 10900 | 10800 | 7900 | 7800 |
| Breaking strength | MPa | 56 | 65 | 51 | 55 | 154 | 175 | 42 | 51 |
| Elongation at break | % | 0.5 | 0.8 | 1.3 | 1.8 | 2.9 | 3.5 | 1.4 | 2.1 |
| Impact strength | kJ/m² | 8.6 | 12 | 6.0 | 9.2 | | | 14 | 21 |
| Notched impact strength | kJ/m² | 4.7 | 6.3 | 3.2 | 4.5 | | | 3.2 | 4.3 |
| HDT A | °C. | 243 | 245 | 172 | 175 | >280 | >280 | 132 | 130 |
| HDT C | °C. | 134 | 138 | 112 | 111 | 190 | 198 | 86 | 90 |
| Thermal conductivity Through Plane/In plane (UL 3.2 mm) | W/mK | 1.7/ 7.3 | 2.0/ 7.7 | 1.3/ 5.0 | 1.8/ 7.0 | | | 1.7/ 8.9 | 1.6/ 8.7 |
| Fire classification UL94 (0.8 mm) | | | | | | V0 | V0 | | |

Captions for Tables 4 and 5

PA 10T/6T Partially aromatic polyamide made of terephthalic acid, 1,10-decane diamine (85 mol-%), and 1,6-hexane diamine (15 mol-%), having a melting point of 307° C. and a relative solution viscosity of 1.64.

PA 66 Partially crystalline, aliphatic polyamide made of 1,6-hexane diamine and adipic acid, having a melting point of 260° C. and a relative solution viscosity of 1.85.

PA 12 Partially crystalline, aliphatic polyamide made of laurin lactam, having a melting point of 178° C. and a relative solution viscosity of 1.90.

Glass fiber B Cut glass fibers Vetrotex 995 made of E glass, having a length of 4.5 mm and a diameter of 10 μm (circular cross section) from Owens Corning Fiberglas, coated using polyurethane resin (prior art).

Glass fiber A1 Cut glass fibers made of E glass, having a length of 4.5 mm and a diameter of 10 μm (circular cross section), coated using water-soluble polyamide A1 using the coating solution PA1 (Table 1). The dry weight of the coating is 1.1 wt.-% in relation to the coated glass fibers.

Glass fiber A2 Cut glass fibers made of E glass, having a length of 4.5 mm and a diameter of 10 μm (circular cross section), coated using a water-soluble polyamide A2 with use of a coating solution similar to PA1, in which the water-soluble polyamide A1 was replaced by the water-soluble polyamide A2. The dry weight of the coating is 1.2 wt.-% in relation to the coated glass fibers.

Glass fiber A3 Cut glass fibers made of E glass, having a length of 4.5 mm and a diameter of 10 μm (circular cross section), coated using a water-soluble polyamide A3 with use of a coating solution similar to PA1, in which the water-soluble polyamide A1 was replaced by the water-soluble polyamide A3. The dry weight of the coating is 0.8 wt.-% in relation to the coated glass fibers.

Boron nitride B Carbotherm PTCP 30 from St. Gobain Ceramics.

Boron nitride A3 Hexagonal boron nitride having a mean particle size of 30 μm (D50), coated using pure water-soluble polyamide A3. The fraction of polyamide A3 in relation to the coated boron nitride is 2.4 wt.-%.

Exolit ® OP 1230 Flame retardant from Clariant, having main component aluminum diethyl phosphinate.

SZM Lotader ® AX8840 (impact toughness modifier).

S/V packet Mixture of a standard heat stabilizer for polyamides and processing aids, for example, lubricants.

The measurements of the properties were carried out according to the following standards and on the following test specimens:

Tensile Modulus of Elasticity:
  ISO 527 using a traction speed of 1 mm/min
  ISO tension rod, standard: ISO/CD 3167, type A1, 170×20/10×4 mm, temperature 23° C.
Breaking Strength, Elongation at Break:
  ISO 527 using a traction speed of 5 mm/min
  ISO tension rod, standard: ISO/CD 3167, type A1, 170×20/10×4 mm, temperature 23° C.
Impact Strength, Notched Impact Strength According to Charpy:
  ISO 179
  ISO testing rod, standard: ISO/CD 3167, type B1, 80×10×4 mm at temperature 23° C.
Melting Point (Tm), Melting Enthalpy (ΔHm), and Glass Transition Temperature (Tg):
  ISO standard 11357-11-2
  granulate
  Differential scanning calorimetry (DSC) was carried out at a heating rate of 20° C./min. For the glass transition temperature (Tg), the temperature is specified for the middle stage or the inflection point.
Relative Viscosity (=Relative Solution Viscosity):
  DIN EN ISO 307
  granulate
  0.5 g polyamide dissolved in 100 ml m-Kresol, measurement at temperature 20° C.
  calculation of the relative viscosity (RV) according to $RV=t/t_0$ based on section 11 of the standard.
HDT A (1.8 MPa) and HDT C (8 MPa):
  The determination of HDT A (1.8 MPa) and HDT C (8 MPa) were performed according to ISO 75 on an ISO impact rod having the dimensions 80×10×4 mm.
Thermal Conductivity:
  According to DIN EN 821 on so-called V0 rods 125×13×3.2 mm using LFA 447 Nanoflash from Netzsch-Geratebau, Selb, Germany
Vertical Fire Test:
  UL-94 Underwriters Laboratories
  testing rod 125×13×0.8 mm
Glass Fiber Length:
  Ascertained weight-averaged fiber length according to ISO/DIS 22314 on each of at least 7000 glass fibers using the FASEP report system from High Precision Dipl.-Ing. (TH) Norbert Hohn, Darmstadt, Germany. Glass fiber length D10, D50, D90: fiber length at which 10, 50, 90 wt.-% of the fibers are shorter than the specified value.
Emission (Outgassing):
  100 mg granulate was initially heated in a test tube for 60 minutes at 120° C. (FOG conditions according to VDA278) and subsequently heated at 200° C. for 45 minutes and the released compounds were quantitatively analyzed by means of GC (FID). For the analysis, all peaks present in the chromatogram were integrated and calculated as the toluene equivalent in μg/g.

The experimental results of Tables 3, 4, and 5 show the general suitability of water-soluble polyamides for the coating of fillers in polyamide molding materials. Breaking strength, impact strength, and notched impact strength, as well as the emission of the polyamide molding materials according to the invention having surface-coated fillers according to the invention are equivalent or improved in relation to the prior art. The thermal stability of the film former was also able to be improved. The thermal stability of the water-soluble polyamide was 55-60° above that of the known polyurethane film formers. This improvement is particularly impressive in consideration of the fact that in U.S. Pat. No. 5,804,313, which was mentioned at the outset, the use of a conventional water-soluble polyamide in the glass fiber sizes in comparison to glass fibers having a polyurethane size was accompanied by worsening of the mechanical properties of the polyamide molding materials reinforced thereby. In the present examples of the invention, however, significantly better properties were achieved using water-soluble polyamides according to the claims, and also in comparison to glass fibers (glass fiber B) having polyurethane coating, i.e., with identical comparison basis. This surprising effect was not to be predicted by a person skilled in the art. The present invention therefore provides a valuable contribution to the improvement of the quality of filled and/or reinforced thermoplastic plastics molding materials, in particular corresponding polyamide molding materials.

The invention claimed is:

1. A filler, with the exception of layered silicates, which has a surface coating, wherein this surface coating comprises a water-soluble polyamide or multiple water-soluble polyamides, wherein at least one of these water-soluble polyamides is produced by polycondensation from the following monomer components:
   (a) at least one linear-aliphatic, branched-aliphatic, cycloaliphatic, and/or aromatic dicarboxylic acid having 6 to 36 C atoms; and
   (b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5- methyl-decane- 1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine 4,7,10,13,16-pentaoxa-nonadecane-1,19-diamine, and 4,17-dioxa-eicosane-1,20-diamine; and
   (b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36 C atoms; and
   (b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycols; and
   (c) 0-45 mol-% of at least one lactam and/or at least one amino carboxylic acid;
   wherein the molar quantity of the monomer component (a) in relation to the total of the molar quantities of the monomer components (b1)+(b2)+(b3) has a molar ratio in the range of 0.8 to 1.2, and
   wherein the fraction of the monomer component (c) relates to the molar total of all monomer components (a)+(b1)+(b2)+(b3)+(c) forming the at least one water-soluble polyamide.

2. The filler according to claim 1, wherein for at least one of the water-soluble polyamides of the surface coating, adipic acid and/or sebacic acid are selected as monomer component (a), 4,7,10-trioxa-tridecane-1,13-diamine and/or 4,7,10,13-tetraoxa-hexadecane-1,16-diamine are selected as monomer component (b1), and optionally hexane diamine is selected as monomer component (b2).

3. The filler according to claim 1, wherein the surface coating consists at least 50 wt.-% of the water-soluble polyamide or multiple water-soluble polyamides.

4. The filler according to claim 1, wherein the surface coating comprises, in addition to the at least one water-soluble polyamide, at least one adhesion promoter.

5. The fillers according to claim 4, wherein the at least one adhesion promoter makes up 10 to 50 wt.-% of the surface coating, in relation to the total mass of the surface coating calculated as the dry mass.

6. The filler according to claim 1, wherein the surface coating does not contain a surfactant and does not contain an adhesion promoter.

7. The filler according to claim 1, wherein the fillers are selected from inorganic and/or organic materials.

8. The filler according to claim 1, wherein the fillers are selected from fibrous and/or particulate materials.

9. The filler according to claim 1, wherein the fillers are selected from the group consisting of glass fibers, carbon fibers, metal fibers, boron fibers, aramid fibers, organic flame retardants, inorganic flame retardants, and/or synergists, thermally and/or electrically conductive additives, and mineral fillers, wherein layered silicates are excluded.

10. A method for producing filled and/or reinforced thermoplastic plastics molding materials, comprising incorporating a filler into at least one polymer, wherein the filler differs from layered silicates and has a surface coating, and wherein this surface coating comprises a water-soluble polyamide or multiple water-soluble polyamides, wherein at least one of these water-soluble polyamides is produced by polycondensation from the following monomer components:

(a) at least one linear-aliphatic, branched-aliphatic, cycloaliphatic, and/or aromatic dicarboxylic acid having 6 to 36 C atoms; and (b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5-methyl-decane-1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-1,13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine, 4,7,10,13,16-pentaoxa-nonadecane-1,19-diamine, and 4,17-dioxa-eicosane-1,20-diamine; and (b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36 C atoms; and (b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycoles; and (c) 0-45 mol-% of at least one lactam and/or at least one amino carboxylic acid;

wherein the molar quantity of the monomer component (a) in relation to the total of the molar quantities of the monomer components (b1)+(b2)+(b3) has a molar ratio in the range of 0.8 to 1.2, and wherein the fraction of the monomer component (c) relates to the molar total of all monomer components (a)+(b1)+(b2)+(b3)+(c) forming the at least one water-soluble polyamide.

11. The method of claim 10, wherein the surface coating is applied to the filler from an aqueous solution, which comprises the water-soluble polyamide or multiple water-soluble polyamides.

12. The method of claim 10, wherein the at least one polymer is selected from the group consisting of polyamides, polycarbonates, polystyrene, polyacrylates, acrylonitrile-butadiene-styrene copolymer, acrylonitrile-styrene copolymer, functionalized polyolefms, polyoxymethylene, polyesters, polysulfones, polyphenylene ether, polyphenylene sulfide, polyphenylene oxide, liquid crystal polymers, polyether ketone, polyether ether ketone, polyimide, polyamide imide, polyester imide, polyester amide, polyurethanes, polysiloxane, and mixtures and copolymers based on these polymers.

13. The method of claim 12, wherein the at least one polymer comprises a polyamide.

14. A thermoplastic plastics molding material, which contains at least one filler different from layered silicates, which has a surface coating which comprises a water-soluble polyamide or multiple water-soluble polyamides, wherein at least one of these water-soluble polyamides is produced by polycondensation from the following monomer components:

(a) at least one linear-aliphatic, branched-aliphatic, cycloaliphatic, and/or aromatic dicarboxylic acid having 6 to 36 C atoms; and (b1) 25-100 mol-% in relation to the total of the molar quantities of the monomer components (b1)+(b2)+(b3) of at least one diamine selected from the group consisting of 4-oxaheptane-1,7-diamine, 4,7-dioxadecane-1,10-diamine, 4,7-dioxa-5-methyl-decane-1,10-diamine, 6-oxa-undecane-1,11-diamine, 4,8-dioxa-undecane-1,11-diamine, 4,8-dioxa-5-methyl-undecane-1,11-diamine, 4,8-dioxa-5,6-dimethyl-undecane-1,11-diamine, 4,9-dioxa-dodecane-1,12-diamine, 4,7,10-trioxa-tridecane-1,13-diamine, 4,7,10-trioxa-5,8-dimethyl-tridecane-1,13-diamine, 4,11-dioxa-tetradecane-1,14-diamine, 4,7,11-trioxa-tetradecane-1,14-diamine, 4,7,10,13-tetraoxa-hexadecane-1,16-diamine, 4,7,10,13,16-pentaoxa-nonadecane-1,19-diamine, and 4,17-dioxa-eicosane-1,20-diamine; and (b2) 0-50 mol-% in relation to the total of the molar quantities of the monomer components (b1)+(b2)+(b3) of at least one linear-aliphatic, branched-aliphatic, cycloaliphatic, and/or aromatic diamine having 2 to 36 C atoms; and (b3) 0-50 mol-% in relation to the total of the molar quantities of the monomer components (b1)+(b2)+(b3) of at least one compound from the group consisting of oligooxyethylene diamines, polyoxyalkylene diamines, and polyalkylene glycoles; and (c) 0-45 mol-% of at least one lactam and/or at least one amino carboxylic acid;

wherein the molar quantity of the monomer component (a) in relation to the total of the molar quantities of the monomer components (b1)+(b2)+(b3) has a molar ratio in the range of 0.8 to 1.2, and wherein the fraction of the monomer component (c) relates to the molar total of all monomer components (a)+(b1)+(b2)+(b3)+(c) forming the at least one water-soluble polyamide.

15. The thermoplastic plastics molding material according to claim 14, wherein the plastics molding material contains at least one polymer, which is selected from the group consisting of polyamides, polycarbonates, polystyrene, polyacrylates acrylonitrile-butadiene-styrene copolymer, acrylonitrile-styrene copolymer, functionalized polyolefms, polyoxymethylene, polyesters, polysulfones, polyphenylene ether, polyphenylene sulfide, polyphenylene oxide, liquid crystal polymers, polyether ketone, polyether ether ketone, polyimide, polyamide imide, polyester imide, polyester amide, polyurethanes, polysiloxane, and mixtures and copolymers based on these polymers.

16. The thermoplastic plastics molding material according to claim 15, wherein the at least one polymer of the plastics molding material comprises a polyamide, so that it is a polyamide molding material.

17. The polyamide molding material according to claim 16, wherein the polyamide molding material contains at least one of the fibrous filler having a surface coating and the particulate filler having a surface coating.

* * * * *

UNITED STATES PATENT AND TRADEMARK OFFICE
CERTIFICATE OF CORRECTION

PATENT NO. : 9,631,070 B2  
APPLICATION NO. : 14/787701  
DATED : April 25, 2017  
INVENTOR(S) : G. Stoeppelmann et al.

It is certified that error appears in the above-identified patent and that said Letters Patent is hereby corrected as shown below:

In the Claims

At Column 22, Line 38 (Claim 1, Line 19), please change "tridecane-13" to -- tridecane-1,13 --.
At Column 25, Line 9 (Claim 15, Line 5), please change "polyacrylates" to -- polyacrylates, --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*